July 11, 1961    H. A. SIEGMANN ET AL    2,991,808
REINFORCED ARTICLES AND METHOD OF MAKING
Filed March 17, 1958

INVENTORS
HENRY A. SIEGMANN
BY WILLIAM J. MURPHY

Morgan, Finnegan, Durham & Pine

United States Patent Office 2,991,808
Patented July 11, 1961

---

2,991,808
REINFORCED ARTICLES AND METHOD OF MAKING
Henry A. Siegmann, New Hyde Park, and William J. Murphy, New York, N.Y., assignors to Chemfab Corporation, New York, N.Y., a corporation of New York
Filed Mar. 17, 1958, Ser. No. 721,873
8 Claims. (Cl. 138—141)

This invention relates to a method for producing reinforced articles having at least one surface which is substantially inert to corrosive and solvent materials. More particularly this invention relates to a method for the production of conduits having at least one surface of a fluorocarbon material such as tetrafluoroethylene polymer or trifluoromonochloroethylene polymer which surface has been reinforced with a suitable reinforcing material. The reinforcing material may be in the form of filaments, roving, cloth, fibers and the like and its composition may be inorganic, such for example as glass or asbestos, as well as organic, such for example as cotton, rayon and the like. The reinforcing material is bonded to the said fluorocarbon surface which has previously been prepared by methods described by Purvis et al. in U.S. Patent No. 2,789,063 by means of a suitable bonding agent such as an epoxy resin.

An object of the present invention is to impart greater rigidity to objects formed from polymers of fluorinated hydrocarbon by means of bonding reinforcing elements thereto.

Another object of the present invention is to produce pipe and tube comprising polymers of fluorinated hydrocarbons having their own structural strength and which are capable of withstanding pressures applied to them either internally or externally.

Other objects and advantages of the invention will be set forth in part hereinafter and in part will be obvious herefrom or may be learned by practice with the invention, the same being realized and attained by means of the instrumentalities and combinations pointed out in the appended claims.

Figure 1:
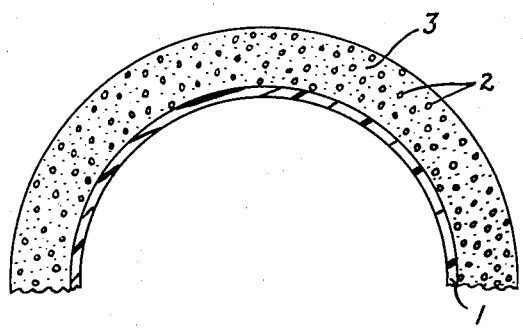
FIGURE 1 is a cross-section of a reinforced conduit having an internal surface of a fluorocarbon.

The present invention is particularly advantageous when used in the production of pipe and tube of various lengths, the internal walls of which are a continuous lining of polymeric fluorinated hydrocarbon. An article may be produced as a variation thereof wherein the outer wall forms the continuous surface of said fluorinated hydrocarbon or where the outer wall as well as the inner wall is a continuous surface of said fluorinated hydrocarbon.

There are at present several ways of producing a pipe or tube which results in one or both surfaces being comprised of a fluorinated hydrocarbon. One such method is to form a tube or pipe which is made up solely of a fluorinated hydrocarbon. Another method is to coat the surface of an ordinary metallic pipe or tube with such a fluorinated hydrocarbon. A third method is to sinter reinforcing elements into the body of an article formed from the resin of a fluorinated hydrocarbon.

None of these methods, or the products derived therefrom, has found great favor with the users of this type of material despite some obviously desirable qualities attendant therewith. A pipe or tube formed solely of a fluorinated hydrocarbon such as Teflon, which is a polymer of tetrafluoroethylene, results in an article which is rather soft and lacking in structural strength. All but quite short lengths of a pipe thus formed tend to sag in use after only a short period of time. It is possible that this is due not only to a lack of structural strength, but partially to a tendency to cold flow. Another problem confronted by the user of such a pipe is the fact that it cannot withstand even relatively low pressures, which makes it impractical for use in most chemical engineering applications.

The ordinary metallic pipe which has been coated with Teflon is usually quite heavy per unit length, and the coating operation is both difficult and costly. The conventional methods for applying such a coat, as for instance flame-spraying, do not insure either completeness of coverage or uniformity of thickness. In addition, metal pipe or tube has undesirable dielectric properties for certain applications.

Completeness of coverage is essential to the proper production of a pipe the use of which is to contain corrosive liquids. This is particularly important when the system in which such pipe is to be used is one wherein the contents of said system are carried at superatmospheric pressures. Even a pinhead's area left unprotected by the chemically impervious or resistant coating will soon develop into a costly and dangerous leak.

The third type of pipe and method of formation described has, in general, the same defects as first. A tube or pipe, produced by using a fluorinated hydrocarbon resin in which reinforcing agents are included by sintering them in with the resin, results in a pipe which has a decided lack of structural strength and a tendency toward cold flow. Piping produced in this manner also has been found to be inadequate for use under conditions of internal or external pressure.

The applicants have overcome the defects of the prior art by producing a novel product comprising a fluorinated hydrocarbon pipe or tube which is reinforced by bonding thereto a layer or layers of a fibrous material by means of a suitable bonding resin. Suitable resins are those which provide good adhesion to fluorocarbon polymer surfaces treated in accordance with the teachings contained in the Purvis et al. Patent No. 2,789,063 or other methods which render the ordinarily insert surface receptive to an adhesive bond. The resins are preferably ones which upon curing are hard, durable, flexible and chemically resistant. Epon resins and epoxy resins have proved to be satisfactory in these respects. Several layers of reinforcement may be used, depending upon the structural strength desired. The present invention insures a complete and uniform thickness of the surface which is to form the chemically inert portion of this pipe or tube due to the novel method involved in the production thereof. It allows the inert surface to be formed for flanging or joining techniques.

The following examples are given by way of illustration and not by way of limitation. Further embodiments of the present inventive concept will be readily deduced therefrom and when read in conjunction with the teachings contained in the specification.

*Example*

A reinforced tube having a lining of tetrafluoroethylene polymer commonly known as "Teflon" and reinforced with braided Fiberglas bonded thereto by an epoxy resin is made by the following method: The outer surface of the Teflon tube which will ultimately form the inner lining of the invention is pretreated by conventional means such as by contacting said surface with a combination of liquid sodium and an anhydrous ammonia at −33° C. which alters the surface characteristics thereof, rendering said surface capable of being bonded by an epoxy resin bonding agent. The Teflon surface is partially oxidized by this treatment. It appears to be a light- to medium-brown color when oxidized to the extent desired for the purposes of the present invention.

The tube prepared in this manner is placed over a snug-fitting mandrel of polished steel. The shape of the mandrel which may be polygonal or elliptical as well as circular in cross-section will determine the shape of the finished product. Due to its inherently good slip characteristics and the smoothness of the mandrel, no special provision need be made to insure easy removal of the Teflon lined product. The surface to which the reinforcement is to be applied is washed with a solvent in order to insure its freedom from any oil or grease. Acetone is particularly preferred because of its good solvent properties and ease of removal by evaporation. A snug-fitting Fiberglas sleeve is then slipped over the clean, treated Teflon tube. Where more than one thickness of reinforcement is desired, it is more efficient to add them before curing. In this way the product is uniformly cured and only one cure is needed. This assembly is then heated to 250° F. and held there thirty minutes. At the end of this period it is removed from the heat source, which may be a recirculating oven. The Fiberglas sleeve component is then impregnated with Epon 828 resin, a product of the Shell Chemical Corporation, having an epoxide equivalent of 185–205 and which has added to it meta-phenylene diamine as a curing agent. The impregnated assembly is then placed in a vacuum for about five minutes. This removes any bubbles present in the bonding medium, thus insuring uniformity of bonding. Upon removal from the vacuum, the epoxy resin is heat-cured in a recirculating oven in accordance with conventional methods. Upon cooling, the reinforced pipe is removed from the mandrel.

Further modification of the invention just described in the foregoing example would be the applying to the reinforced pipe, which is lined with Teflon, a chemically impervious outside cover which would protect it from attack if it were used in applications wherein the outer surface was also exposed to corrosive or solvent liquid. The piping made as described in the example is merely further treated by applying to the reinforcement layer, at the point in the process immediately following the impregnation of the reinforcement material with the uncured epoxy resin, an outer sleeve of Teflon of a predetermined size which would insure intimate contact with the epoxy-treated reinforcement material—the inner surface of such outer tube having been, or course, prepared in the same manner as the outer surface of the tube used as the inner liner; that is, by treatment with liquid sodium and an anhydrous ammonia composition.

The reinforcement material may, rather than being applied in the formation of a sleeve, be wrapped about the Teflon tube helically or when cloth is used it may be wrapped axially; the important feature of the reinforcing material, aside from its ability to impart structural strength to the Teflon tubing with which it is used, being that it allow the impregnant resin to come into intimate contact with the prepared Teflon surface.

The product resulting from the above-described method represents a chemically impervious conduit having sufficiently high structural strength and ability to withstand internal or external pressure, which makes it advantageously used in the construction of many chemical-process, industry-production facilities.

The degree of rigidity or flexibility may be varied, depending upon the ultimate uses to which the invention is to be put. The manner of alignment of the reinforcement, the length of tubing used, and the amount of reinforcement may be varied in any combination to produce the desired result.

One variation which allows the production of a conduit which is to a degree thermoplastic comprises using an impregnating-resin formulation containing a polymerized fatty acid. The use of this formulation results in the production of a tube or pipe which may be curved or bent.

The products of the above-described methods provide an insulated, strong, lightweight, corrosion-resistant, rigid, semiflexible or flexible conduit which is resistant to almost all known chemicals and solvents under pressure. It is safely used without having to resort to any additional operative step, such as adhering or cementing a fluorinated lining to various types of pipe or tube, or to supporting a pipe or tube of fluorinated hydrocarbon in a protective sheath of armor. The product of the applicants' invention already has the strength desired as well as the inertness to attack by solvents or corrosive materials.

Reference is made now more particularly to the drawings illustrating different embodiments of the invention.

FIGURE 1 shows a conduit having a lining 1 of fluorinated hydrocarbon reinforced with filaments 2 and bonded to it with a resin 3.

Figure 2:
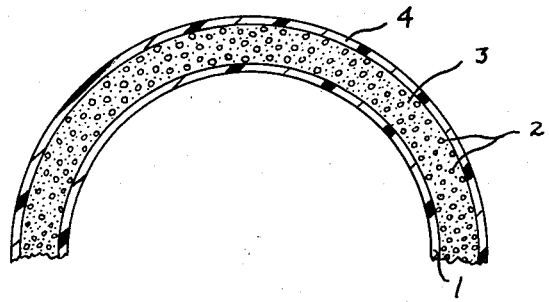
FIGURE 2 is a cross-section of a reinforced conduit having both inner and outer surfaces of a fluorocarbon.

FIGURE 2 shows a conduit consisting of filaments 2 and a resin binder 3 adhered to liner 1 and outer covering 4 of fluorinated hydrocarbon.

The invention in its broader aspects is not limited to the specific processes and steps described, but departures may be made therefrom within the scope of the accompanying claims without departing from the principles of the invention and without sacrificing its chief advantages.

What is claimed is:

1. A reinforced conduit comprised of at least one hollow, inner tube of a corrosion-resistant, solvent-resistant fluorocarbon polymer having a partially oxidized outer surface and an epoxy resin adhesive-impregnated fiber-glass sleeve surrounding said hollow, inner tube and in overall engagement with the partially oxidized outer surface and firmly adhered to the partially oxidized surface by the epoxy-resin adhesive.

2. The article of claim 1 wherein the sleeve is spun fiber-glass.

3. The article of claim 1 wherein the sleeve is woven fiber-glass.

4. The article of claim 1 wherein the corrosion-resistant, solvent-resistant tube is polytetrafluoroethylene.

5. The article of claim 1 wherein the corrosion-resistant tube is polytrifluoromonochloroethylene.

6. A conduit comprised of a hollow, inner tube of a corrosion-resistant, solvent-resistant fluorocarbon polymer having a partially oxidized outer surface, a hollow, outer tube of a corrosion-resistant, solvent-resistant fluorocarbon polymer having a partially oxidized inner surface, and an epoxy resin adhesive-impregnated fiber-glass sleeve between the inner tube and outer tube, said sleeve surrounding the inner tube and being surrounded by the outer tube, said sleeve also being in overall engagement with the partially oxidized surfaces of said tubes and firmly adhered to said partially oxidized surfaces by the epoxy resin adhesive.

7. A method of making reinforced conduits which comprises preforming a hollow, inner tube of fluorocarbon polymer in the shape desired, chemically treating the outer surface of the tube to partially oxidize the fluorocarbon polymer at said surface so as to render it receptive to an adhesive resin, forming a fiber-glass reinforcing sleeve in a shape complementary to the partially oxidized surface of said tube, slipping the fiber-glass sleeve element over said tube and into contact with the partially oxidized outer surface thereof, impregnating the fiber-glass sleeve with epoxy resin adhesive so that the adhesive contacts the partially oxidized surface of the tube, and curing the resin, thereby bonding the fiber-glass sleeve to the partially oxidized surface of said tube.

8. A method of making reinforced conduits which comprises preforming a hollow, inner tube of fluorocarbon polymer in the shape desired, contacting the outer surface of the tube with a mixture comprising liquid sodium and anhydrous ammonia to partially oxidize the fluorocarbon polymer at said surface so as to render it receptive to an adhesive resin, forming a fiber-glass sleeve having a shape complementary to the partially oxidized surface of said tube, slipping the fiber-glass sleeve over the chemically treated surface of the tube, impregnating the reinforcing element with epoxy resin adhesive so that the adhesive contacts the partially oxidized surface of the tube, and curing the resin, thereby bonding the fiber-glass sleeve to said tube.

References Cited in the file of this patent

UNITED STATES PATENTS

| | | |
|---|---|---|
| 2,536,243 | Walker et al. | Jan. 2, 1951 |
| 2,783,173 | Walker et al. | Feb. 26, 1957 |
| 2,789,063 | Parots | Apr. 16, 1957 |
| 2,824,033 | Donaldson | Feb. 18, 1958 |
| 2,828,236 | West | Mar. 25, 1958 |
| 2,932,597 | Alexander | Apr. 12, 1960 |